UNITED STATES PATENT OFFICE.

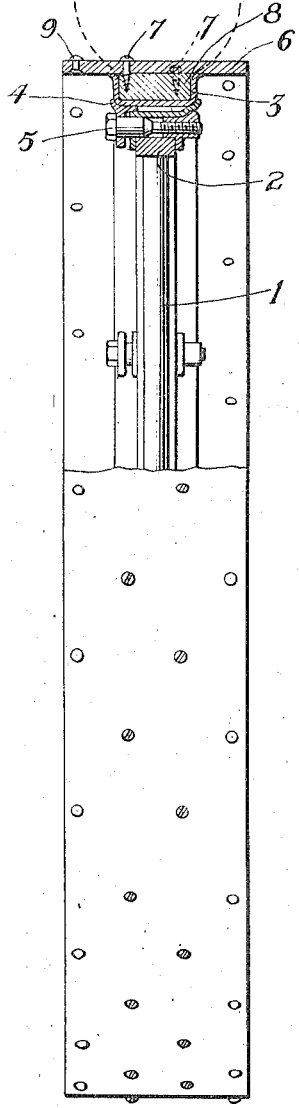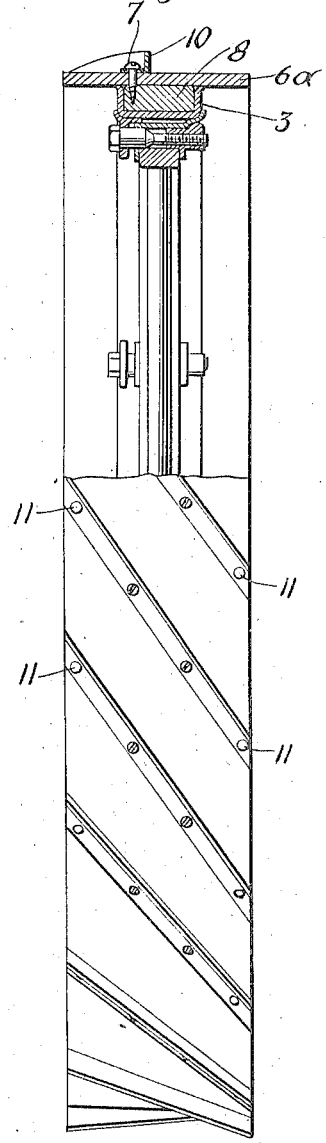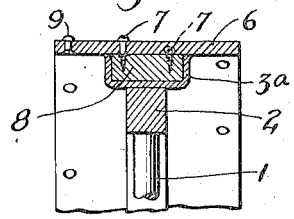

WILLIAM H. COLDWELL, OF NEWBURGH, NEW YORK.

WHEEL.

1,286,536.    Specification of Letters Patent.    Patented Dec. 3, 1918.

Application filed October 15, 1917. Serial No. 196,653.

*To all whom it may concern:*

Be it known that I, WILLIAM H. COLDWELL, a citizen of the United States, residing at Newburgh, in the county of Orange and State of New York, have invented certain new and useful Improvements in Wheels; and I do hereby declare the following to be a full, clear, and exact description of the invention, such as will enable others skilled in the art to which it appertains to make and use the same.

My invention consists in the novel features hereinafter described, reference being had to the accompanying drawing, which illustrates two forms in which I have contemplated embodying my invention, and which have been selected by me for purposes of illustration, and said invention is fully disclosed in the following description and claim.

The object of my invention is to provide a traction wheel with a demountable and changeable traction tread so that a tractor may readily be provided with traction treads for its traction wheels, which are especially adapted for the use to which the machine is to be put. My invention is particularly applicable to small light tractors adapted for use in connection with lawn mowers, rollers, and other similar purposes in connection with golf courses, large estates, etc., where the same tractor is or may be utilized for various purposes.

In the accompanying drawing:

Figure 1 represents an elevation partly in section showing a form of my improved traction wheel, which is especially adapted for use on lawns, golf courses, and the like.

Fig. 2 represents a similar view of a traction wheel more particularly adapted for use on heavy roads or rough ground.

Fig. 3 is a partial view of a wheel illustrating a modification.

In Fig. 1, for example, I have shown my invention applied to a well known type of demountable rim wheel, the specific construction of which may be of any known or preferred character. Thus 1 represents the body of the wheel provided with the integral rim, 2, and the demountable metal rim, 3, detachably secured thereto in any desired manner as by a plurality of wedge pieces, 4, and screws, 5. This type of wheel is designed to receive a pneumatic tire, and to be used in connection with an automobile, and has never been provided with special traction treads other than those usually employed in connection with pneumatic tires, so far as I am aware.

In carrying out my invention, I provide a cylindrical metal traction rim, indicated at 6, of such internal diameter that it may be placed around the demountable rim, 3. The space within the demountable rim, 3, is filled with a suitable filling, preferably blocks of wood of the required size and shape to completely fill the space within the rim, and to afford together with the peripheries of the lips of the rim, 3, a broad cylindrical support for the exterior traction rim, 6. The traction rim, 6, is secured to the demountable rim, 3, detachably by means of screws, indicated at 7, which pass through the traction rim and into the filling, which is indicated at 8, thus securely holding the traction rim and the demountable rim, 3, together.

In the form of my invention, shown in Fig. 1, the traction rim is especially adapted for use on lawns and is provided with separated projections, substantially semi-spherical in form, of such size and height as to afford traction on a lawn without marking or injuring the same. I prefer to use screws, 7, as shown, provided with rounded heads which are of the size and shape mentioned so that the heads of the screws provide one or more, preferably two, rows of the traction projections on the outer face of the rim, 6. Additional projections of the same size may be conveniently provided by using a plurality of rivets indicated at 9, the heads of which are of substantially the same size and shape as the heads of the screws, 7, on the outer face of the traction rim, or the projections, 9, may be formed integrally with the rim by a swaging or rolling process when the rim is made, or otherwise as desired.

I prefer to have the rivets, 9, where they are used, so formed that they do not project on the inner face of the rim, 6, and this can be readily effected by counter-sinking the rivet holes on their inner ends, as indicated in Fig. 1, the object being that by unscrewing the screws, 7, the rim, 6, can be withdrawn from the demountable rim, 3, and filling, 8, and a different rim, having a different character of exterior traction surface substituted.

Thus in Fig. 2, I have shown a similar wheel formed in the same manner, the parts of which are given the same numbers so far as they are identical. The traction rim, 6ª, in this figure is held in place on the rim, 3, by the screws, 7, as heretofore described, but the exterior of the rim, 6ª, is provided, in this instance, with angular ribs or cleats, 10, preferably formed of angle iron, having outwardly projecting flanges and flanges which lie upon the outer surface of the rim, 6ª, and which are secured to the rim, 6ª, in part by the screws, 7, which unite the rim, 6ª, to the filling, 8, and demountable rim, 3, and said cleats may be further held, if desired, by screws or rivets, 11.

It will be seen that a tractor provided with traction wheels of the character shown, for example, in Fig. 1, is especially adapted for use on lawns, golf courses, and other grassy surfaces. Should it be desired to employ the tractor for hauling on rough roads, or for plowing, or other purposes, where a more severe form of traction surface is desired, (which could not be used on a lawn without injuring it,) the wheels may be changed in either one of two ways. By providing an additional set of demountable rims, 3, one equipped with the form of exterior traction rim, shown in Fig. 1, and the other with the form of exterior traction rim, shown in Fig. 2, the wheels may be changed by simply removing the demountable rims, 3, by loosening the screws, 5, and wedges, 4, and substituting another demountable rim, 3, provided with a different traction rim having a different form of traction surface.

In like manner if the tractor is to be used on a smooth road, the demountable rim, 3, may be removed and another demountable rim provided with a pneumatic tire may be substituted for the demountable rim carrying the traction rim. It will also be seen that the advantages of my invention may also be obtained with a single set of demountable rims, 3. For example, to change a wheel of the character shown in Fig. 1, to that shown in Fig. 2, it is only necessary to remove the screws, 7, and slide off the exterior rim, 6, and apply the rim, 6ª, and reinsert the screws, 7, to equip the wheel with a new rim having a different character of friction surface, while at the same time any one of the rims, 3, can be instantly removed with its exterior tread of whatever character it may be, for the purpose of repair and another similar rim and tread may be substituted so that the operation of the tractor will not be interfered with.

I prefer to make the filling, 8, of such character that it can be removed from the rim, 3, so that if it should be desired to equip the wheel with the pneumatic tires without the aid of an extra set of rims, 3, the exterior traction rim, 6, or 6ª, can be removed together with the filling, 8, and an ordinary automobile tire applied to the rim, 3.

While I have shown my invention as applied to a wheel provided with a demountable rim, it will be understood that the demountable traction rims herein shown and described may be in like manner applied removably to wheels in which the rim portion corresponding to the rim, 3, herein shown, is permanently fixed to the other portions of the wheel instead of being demountably secured, as herein shown and described.

In Fig. 3, I have shown a partial section of a wheel in which the rim, indicated at 3ª, is so formed as to be permanently united to the other portions of the wheel and provided with the filling indicated at 8, and the removable friction tread or rim, indicated at 6, similar to the one shown in Fig. 1.

What I claim and desire to secure by Letters Patent is:

In a tractor wheel, the combination with the wheel body provided with a rim having lateral flanges forming a peripheral channel between said flanges, of filling material located in said channel between said flanges, an auxiliary traction rim surrounding said flanges, and means out of contact with said flanges for securing said traction rim to said filling material.

In testimony whereof I affix my signature.

WILLIAM H. COLDWELL.